United States Patent

Sato

[15] 3,678,213

[45] July 18, 1972

[54] MAGNETIC RECORDING AND/OR REPRODUCING SYSTEM HAVING GUIDE PINS MOUNTED ON INDEPENDENTLY ROTATING PLATES FOR WITHDRAWING TAPE FROM CASSETTE

[72] Inventor: Seizi Sato, Kanagawa, Japan

[73] Assignee: Sony Corporation, Toyko, Japan

[22] Filed: Sept. 18, 1970

[21] Appl. No.: 73,561

[30] Foreign Application Priority Data

Sept. 19, 1969 Japan....................................44/74870

[52] U.S. Cl. ....................179/100.2 Z, 179/100.2 T, 226/91, 274/4 E

[51] Int. Cl......................................G11b 15/66, G11b 23/04

[58] Field of Search...........179/100.2 Z, 100.2 T, 100.2 MD; 226/183, 91, 90, 49; 274/4 D, 4 E

[56] References Cited

UNITED STATES PATENTS

| | | | |
|---|---|---|---|
| 3,512,694 | 5/1970 | Sugaya et al. | 179/100.2 T |
| 3,555,205 | 1/1971 | Barkouki | 179/100.2 T |
| 3,107,279 | 10/1963 | Hanes et al. | 179/100.2 Z |

FOREIGN PATENTS OR APPLICATIONS

| | | | |
|---|---|---|---|
| 1,537,240 | 10/1967 | Germany | 179/100.2 T |

OTHER PUBLICATIONS

IBM Technical Disclosure Bulletin, R. B. Johnson et al., Vol. 9, No. 8 Jan. 1967, page 968.

*Primary Examiner*—Bernard Konick
*Assistant Examiner*—Alfred H. Eddleman
*Attorney*—Lewis H. Eslinger, Alvin Sinderbrand and Curtis, Morris & Safford

[57] ABSTRACT

In a tape recording and reproducing device adapted for use with magnetic tape cassettes and having a rotary magnetic head for recording and reproducing signals on the tape while the latter is wrapped about a guide drum, an apparatus is provided for withdrawing the tape from the cassette and guiding the tape into contact with the guide drum for skewed scanning by the head or heads. The tape guiding apparatus includes first and second tape guide members mounted for movement on the device along a generally arcuate path about the periphery of the drum from a first station adjacent the cassette to a second station remote from the cassette, and each of the guide members includes a guide pin or pins for engaging the tape within the cassette and guiding the tape about the guide drum. The guide pin on the first guide member, when located at the second station, holds the tape in wrapped engagement with the guide drum, and the guide pin, on the second guide member guides the tape along a return path remote from the drum back to the cassette. The first and second guide members are operably connected for relative movement therebetween during movement from the first to the second station.

14 Claims, 7 Drawing Figures

INVENTOR.
SEIZI SATO

BY
Lewis H. Eslinger
ATTORNEY

INVENTOR.
SEIZI SATO
BY
ATTORNEY

INVENTOR.
SEIZI SATO
BY
[signature]
ATTORNEY

INVENTOR.
SEIZI SATO

BY [signature]
ATTORNEY

MAGNETIC RECORDING AND/OR REPRODUCING SYSTEM HAVING GUIDE PINS MOUNTED ON INDEPENDENTLY ROTATING PLATES FOR WITHDRAWING TAPE FROM CASSETTE

This invention relates to a magnetic recording and reproducing device, such as, for example, a video tape recorder, and more particularly to a magnetic recording and/or reproducing device having a tape guide system which guides the magnetic tape along a predetermined arcuate path for engagement by a rotary magnetic head or heads.

Magnetic recording and/or reproducing devices of the above type have previously been proposed in which a magnetic tape is directed around a generally cylindrical tape guide drum over a predetermined angular range, for example 180° to 360°, whereby the tape is scanned by one or more rotary magnetic heads mounted concentrically with the drum to magnetically record video signals on the tape and/or to reproduce recorded signals from the tape. Conventional magnetic video tape recording and reproducing devices generally require manual operation for wrapping the tape around the tape guide drum over the predetermined arcuate path, which manual operation is both tedious and difficult. The tape wrapping operation is further complicated when a tape cartridge or cassette, having no free tape end, is used. Attempts have been made in the past to provide tape guide systems for magnetic video tape recording and/or reproducing devices which use video tape cassettes or cartridges, and wherein the tape guide system automatically pulls the magnetic tape from the cartridge at an initial tape position to a wrapped position about the rotary magnetic head. However, such previously proposed devices have generally required relatively complicated mechanisms to perform the operation, and moreover, such devices utilize a substantially large space about the tape guide drum and rotary magnetic head or heads, whereby excessively large tape decks are required.

Accordingly, it is an object of the present invention to automatically withdraw a magnetic tape from a tape cassette or cartridge to a position about the guide drum associated with the rotary magnetic head or heads of a tape recording and reproducing device.

It is another object of the present invention to provide a tape guide system for a tape recording and reproducing device which system is both simple and inexpensive in construction.

Yet another object of the present invention is to closely wrap a magnetic tape about the guide drum associated with a rotary magnetic head or heads, and in which the angular extent of the wrap is accurately predetermined.

Another object of the invention is to automatically wrap magnetic tape about a tape guide drum associated with the rotary magnetic heads in a tape recording and reproducing device after a cartridge or cassette containing the tape is loaded in a predetermined position on the recording and reproducing device.

It is still another object of the invention to provide a tape guide system which is relatively compact in construction and simple in operation.

In accordance with an aspect of this invention, a tape cassette recording and reproducing device having a rotary magnetic head or heads associated with a tape guide drum is provided with means for moving the tape from the cassette into contact with the tape guide drum for skewed scanning by the head. The tape moving means includes a first guide plate mounted on the recording and reproducing device for movement in an arcuate path about the guide drum from a first station adjacent the cassette to a second station remote from the first station. The first guide plate has one or more guide pins mounted thereon which extend generally perpendicularly from the plate. When the tape cassette is positioned at the first station, the tape therein extends along a path between the tape guide drum and the guide pins so that as the first guide plate is moved from the first to the second station, the tape is pulled by the guide pin or pins from the cassette into contact with the tape guide drum and the rotary magnetic head along a predetermined arcuate path. A second guide plate member is slidably mounted on the first guide plate by means of a pin and slot arrangement which permits independent rotational movement of the first guide plate with respect to the second guide plate along a predetermined arcuate portion of the arcuate path of travel of the first guide plate. The second guide plate has a guide pin mounted thereon which extends generally perpendicularly to the plate and which, at the second station, guides the tape along a return path remote from the guide drum as the tape is returned to the takeup reel. The limited independent rotational movement of the first plate with respect to the second plate permits the first and second plates to be positioned in a compact superimposed relation at the first station whereby the respective guide pins are located behind the tape and are thus adapted to engage the tape during movement from the first station to the second station. This independent movement permits the plates to move to a substantially different angular relationship with respect to the tape guide drum as they approach the second station so that the pin on the second guide plate will be positioned to hold the tape away from the tape guide drum as it is returned to the tape cassette.

The above, and other objects, features and advantages of this invention, will be apparent in the following detailed description of an illustrative embodiment thereof which is to be read in connection with the accompanying drawings wherein.

Figure 1:
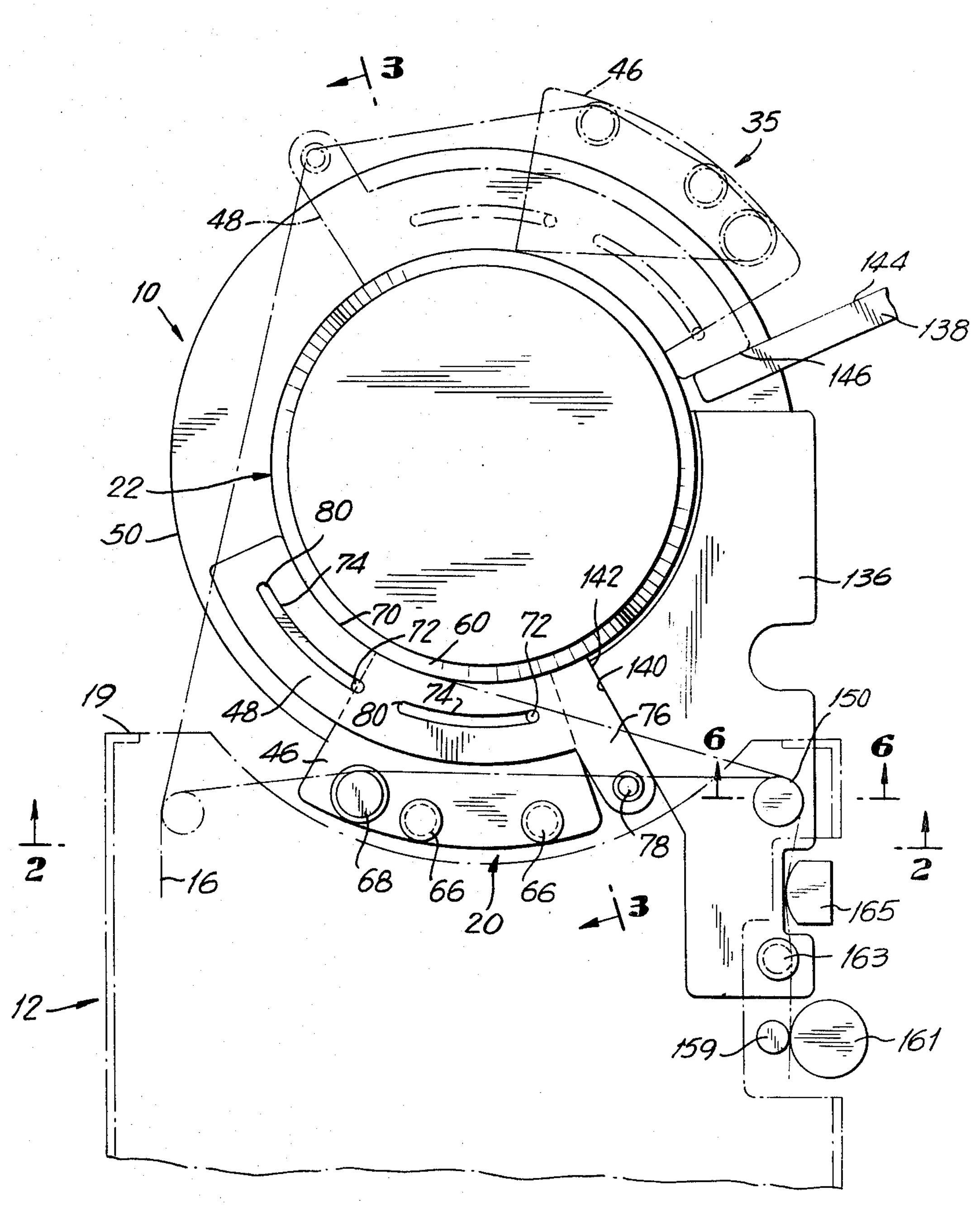
FIG. 1 is a schematic plan view of a tape guide apparatus according to an embodiment of the present invention.

Referring to the drawings in detail, and initially to FIG. 1 thereof, it will be seen that a tape cassette recording and reproducing apparatus 10 embodying the present invention, as shown therein, has a recording and reproducing station 12 at which a cassette 14 is adapted to be placed. Cassette 14 includes supply and takeup reels for magnetic recording tape 16, as more fully described hereinafter with reference to FIG. 5, and is illustrated in phantom in FIG. 1 for clarity. A recess 18 is formed in a wall 19 of the cassette to expose a portion of the tape 16 in its path of travel between the supply and takeup reels and, when the cassette is located at recording and reproducing station 12, the tape extending through recess 18 is positioned for engagement with a tape guide system 20. The system 20 is adapted to draw the tape from cassette 14 into engagement about a tape guide drum 22, where signals are magnetically recorded on, or reproduced from the magnetic tape during operation of the apparatus.

Figure 2:
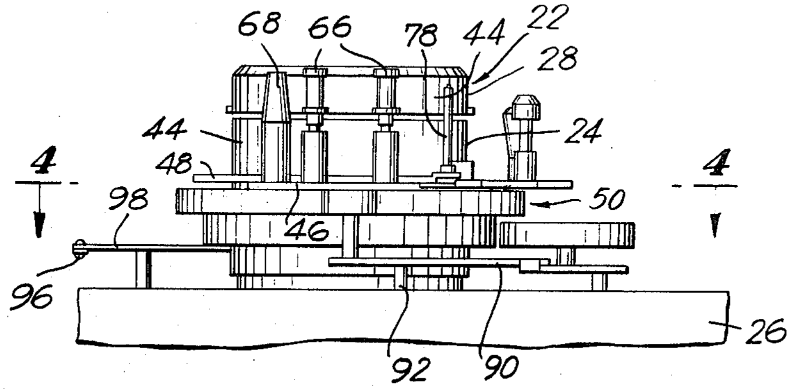
FIG. 2 is a side view taken on line 2—2 of FIG. 1.
Figure 3:
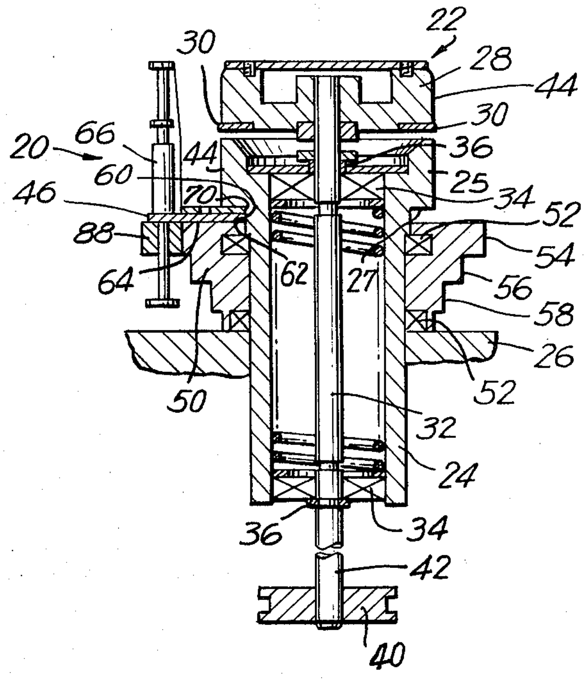
FIG. 3 is a side sectional view taken on line 3—3 of FIG. 1.

Tape guide drum 22, as seen in FIGS. 2 and 3, includes a lower cylindrical portion or housing 24 rigidly mounted in a deck or base plate 26 of apparatus 10 and an upper cylindrical portion 28 which carries a pair of diametrically opposed magnetic recording and reproducing heads 30. Housing 24 includes an upper enlarged portion 25 having substantially the same diameter as drum portion 28 and defines a shoulder 27 which serves as a guide track for guide system 20, as is more fully described below. Upper cylindrical drum portion 28 is rigidly secured to a generally vertically extending shaft 32, which shaft is rotatably supported in bearings 34 mounted in housing 24. Bearings 34 are held in position in housing 24 against retaining rings 36 secured to shaft 32 by a spring 38, positioned between the bearings and around the shaft. A pulley 40 is secured to the lower end 42 of shaft 32 and is driven from a suitable motor (not shown) so that magnetic recording and reproducing heads 30 will scan skew tracks on magnetic tape 16 when the latter is wrapped helically about the upper peripheral surfaces 44 of drum sections 28 and 24 by tape guide system 20.

Tape guide system 20 includes first and second guide members 46 and 48 mounted on a carrier support ring 50. Ring 50 is mounted on bearings 52 secured to the peripheral surface of drum portion 24, to permit rotation of the ring about the same axis as the drum portion 28, that is, the axis of rotation of shaft 32. Ring 50, as seen in FIG. 3, has a stepped peripheral surface including three annular surface portions 54, 56 and 58 which, as more fully described hereinafter, are utilized to control movement of guide members 46 and 48 between a first position, shown in solid lines in FIG. 1, at the recording and reproducing station 12, and a second position or station 35, shown in phantom lines in FIG. 1, and wherein tape 16 is wrapped around a predetermined arcuate portion of guide drum 22 for operative engagement with magnetic heads 30.

First guide member 46 constitutes a generally sector shaped plate having an inner arcuate edge portion 60 which is positioned below shoulder 27 and against the adjacent peripheral surface 62 of the lower section of housing 24. Plate 46 is fixedly secured to the upper surface 64 of ring 50 and carries a pair of generally cylindrical flanged guide pins 66 extending perpendicularly therefrom. A tapered guide pin 68 is similarly mounted on plate 46. Pins 66 and 68 are positioned on guide plate 46 so that when cassette 14 is inserted at recording and reproducing station 12 the pins are located within cassette opening 18 and behind tape 16. In this manner when ring 50 and plate 46 are rotated in the clockwise direction as viewed in FIG. 1 from recording station 12 to the second station 35, pins 66, and principally pin 68, will draw tape 16 from the cassette and wrap the withdrawn tape about the tape guide drum 22. The tapered peripheral surface of pin 68 serves to alter the direction of tape travel to assist in directing the tape along a helical path over the surface of drum 22, as is required for scanning of skew tracks on the tape by magnetic heads 30.

Second guide member 48 is formed as an arcuately shaped plate and is positioned immediately above plate 46. Plate 48 has an inner peripheral edge 70 which is engaged beneath shoulder 27 and against the adjacent peripheral surface 62 of housing 24. The close fit of plates 46 and 48 between shoulder 27 and ring 50 maintains the vertical position of plate 48 with respect to plate 46 and operates to guide the plates during movement between stations.

Plate 48 is slidably mounted on plate 46 by means of a pair of upstanding pin members 72, secured to plate 46 and engaged in arcuate slots 74 formed in plate 48. Pins 72 and slots 74 permit a limited relative angular displacement between plate 46 and plate 48 during the operation of the device. Plate 48 has an arm 76 extending radially therefrom and carrying a generally upstanding cylindrical guide pin 78. Pin 78 is also positioned, as seen in FIG. 1, behind tape 16 in recess 18 when cartridge 14 is positioned at recording and reproducing station 12.

Figure 4:
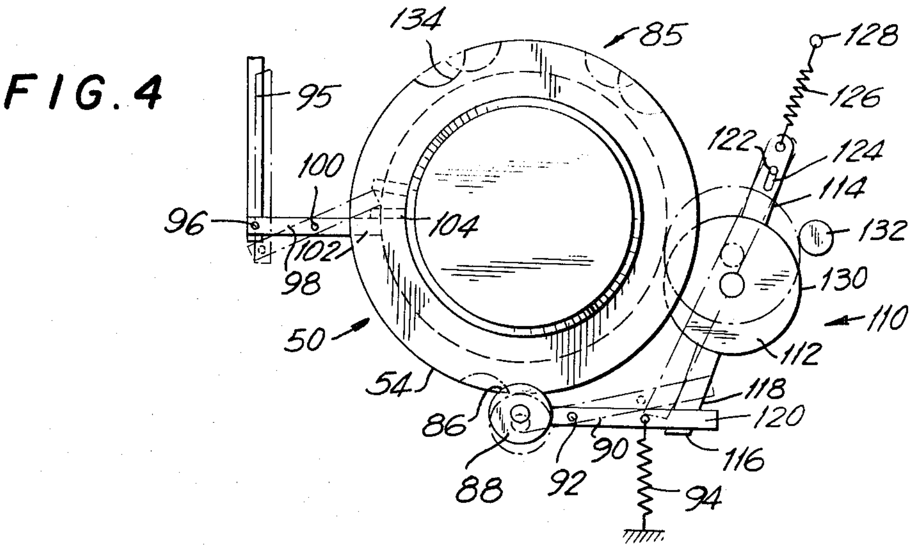
FIG. 4 is a schematic plan view taken on line 4—4 of FIG. 2.

Carrier ring 50 and plate 46 are initially moved in the clockwise direction from recording and reproducing station 12 towards station 35 by a drive system 85 (FIG. 4). Plate 46 is initially moved independently of plate 48 which is held in its original position by inertia. After plate 46 has turned through approximately 30° , that is, the extent of slots 74, pins 76 engage ends 80 of the slots to draw plate 48 therewith along the arcuate path about drum 22. When ring 50 and plate 46 have reached second station 35, the rotation thereof is stopped and plates 46 and 48 are positioned as shown in phantom lines in FIG. 1. Due to the relative movement between plates 46 and 38, the relative positioning of pins 78 and 68 at station 35 is substantially different from their relative positioning at station 12. Thus, tape 16 is drawn by pin 68 along the peripheral surface 44 of drum 22 and returned over pins 66 and 78 to cassette 14 along a path that is remote from drum 22. By constructing the tape guide system 20 in the described manner, such system has a relatively compact configuration at recording and reproducing station 12 so that the operative components thereof, that is, the pins 66, 68 and 78 necessary for guiding the tape, are relatively close together and positioned behind tape 16. On the other hand, when at station 35, the guide pins 66, 68 and 78 are properly spaced about the tape drum to hold the tape helically against the drum for skew scanning while the tape is drawn from the cassette and to simultaneously hold the tape away from the drum on its return path to cassette 14 from drum 22.

Drive system 85 utilized to control the rotational movement of ring 50 is illustrated in FIG. 4. As shown therein, the upper peripheral surface portion 54 of ring 50 has a generally semicircular recess 86 in which a roller 88, mounted for rotation on a lever 90, is engageable to hold ring 50 against rotation. Lever 90 is pivotally mounted at 92 on deck 26, and is biased by a spring 94 in a generally clockwise direction to urge roller 88 against portion 54 and thereby maintain engagement of roller 88 within recess 86. With roller 88 engaged in recess 86, carrier ring 50 is held against rotation with guide plates 46 and 48 located at recording and reproducing station 12. When it is desired to operate the apparatus, cassette 14 is inserted at recording and reproducing station 12 and a playback or record button (not shown) is depressed. This button is connected through conventional mechanical linkages to a push rod 95 which is pivotally connected at 96 to a lever 98. The lever 98 is pivotally mounted on deck 26 by a pivot pin 100 and has a free end 102 which engages a projection 104 extending from the lowermost peripheral surface section 58 of ring 50. Projection 104 extends from section 58 at a location such that, when roller 88 is engaged in recess 86, the projection 104 is adjacent free end 102 of lever 98. Movement of push rod 95, as shown in phantom lines in FIG. 4, rotates lever 98 in a counterclockwise direction to move projection 104 and thus, displace carrier ring 50 in a generally clockwise direction. In this manner, recess 86 is moved away from roller 88 and the latter rides on surface section 54 with the result that peripheral surface 56 of ring 50 is engaged by a rotary drive mechanism 110.

Drive mechanism 110 includes a driving wheel 112 mounted for rotation on an arm 114. The latter includes a hook or abutment member 116 at its free end 118, which hook is engaged with the end 120 of lever 90. Arm 114 has a slot 124 which permits sliding movement of the arm on a pin 122 secured to deck 26 and is biased upwardly, as seen in FIG. 4, by a spring 126 secured at one end to arm 114 and at its other end to a fixed anchor 128 within the housing of the apparatus.

In the inoperative mode of the apparatus, hook 116 engages free end 120 of lever 90 and arm 114 is held thereby against the action of spring 126, in the solid line position shown in the drawings, whereby the peripheral surface 130 of wheel 112 is held away from peripheral surface portion or section 56 of ring 50. Surface portion 56 and peripheral surface 130 of wheel 112 constitute cooperating friction drive elements, and a drive shaft 132 connected to a motor (not shown) is adapted to frictionally engage wheel 112 to drive the same. When push rod 95 is actuated, so that roller 88 is moved out of recess 86, lever 90 moves to the dotted line position shown in FIG. 4 thereby releasing arm 114. In this manner, arm 114 is permitted to move upwardly, as viewed in FIG. 4, under the influence of spring 126 so that the peripheral surface 130 of wheel 112 is engaged with surface 56 of ring 50 and with drive shaft 132, whereby wheel 112 is driven in a counterclockwise direction and ring 50 is driven in a clockwise direction.

Peripheral surface portion 54 of carrier ring 50 includes a second notch 134 located approximately 210° rearwardly of notch 86 in the direction of rotation of ring 50. As ring 50 is rotated to move guide plates 46 and 48 from recording and reproducing station 12 to second station 34, notch 134 is moved to a position wherein it is presented adjacent roller 88. The roller 88, having ridden on peripheral surface portion 54 during rotation of ring 50 is moved into notch 134 under the influence of spring 94. Lever 90 is thereby returned to its full line position and driven wheel 112 is removed from engagement with surface portion 56 and drive shaft 132. Accordingly, rotation of ring 50 is stopped and guide plates 46 and 48 are located at second station 35.

Referring again to FIG. 1, it will be seen that stop members 136 and 138 are provided adjacent recording and reproducing station 12 and station 35, respectively. Stop member 136 is in the form of a plate having an edge surface 140 which is adapted to engage edge 142 of guide plate 48. Similarly, stop member 138 has a surface 144 which is adapted to engage edge 146 of guide plate 48 at station 35. In this manner, movement of plate 48 beyond its predetermined position at each of these stations, due to inertia, is prevented.

Drive shaft 132 is adapted to be rotated in an opposite direction on completion of the recording and/or reproducing so that carrier ring 50 is rotated in an opposite direction when a stop or rewind control button (not shown) is operated. Thus, carrier plates 46 and 48 are returned to recording and reproducing station 12 and tape 16 is released from engagement about the peripheral surface of tape guide drum 22 and withdrawn into cassette 14 so that the latter may be removed from the device.

Figure 5:
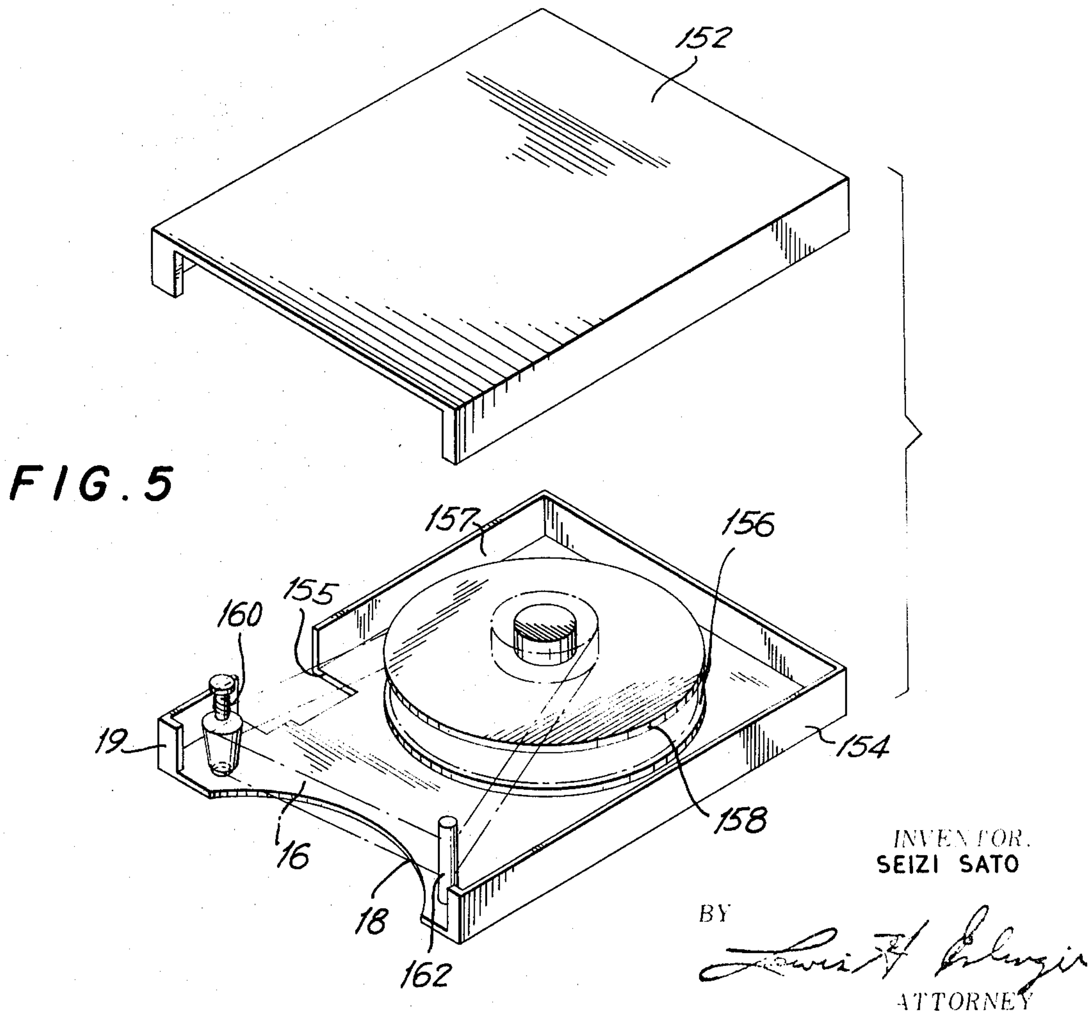
FIG. 5 is an exploded perspective view of a tape cassette constructed for use with the present invention.

In order to properly locate cassette 14 at recording and reproducing station 12, a guide pin 150 is provided on stop plate 136 which pin is adapted to be engaged with cassette 14. Referring to FIG. 5, it will be seen that cassette 14 includes an upper housing portion 152 and a lower housing portion 154. Lower portion 154 includes front wall 19 provided with recess 18 across which tape 16 extends along its path of travel. Cassette 14, is provided with a pair of coaxial reels, constituting a supply reel 156 and a takeup reel 158 positioned above reel 156. The supply and takeup reels are supported for independent rotation at the upper ends of telescoping rotary shafts (not shown), which shafts are selectively driven by a motor in a conventional manner. Lower housing section 154 also includes a second recess or opening 155 in its side wall 157 across which tape 16 passes in its path of travel between reels 156 and 158. When cassette 14 is inserted at station 12, tape 16 in opening 155 is positioned for engagement by the usual capstan 159 and pinch roller 161 (FIG. 1) of the recording and reproducing apparatus. In addition, a guide pin 163 and magnetic head 165, for recording and reproducing sound, are located on deck 26 for engagement with tape 16.

To guide tape 16 along its path of travel, a pair of guide pins 160 and 162 are provided within the cassette. Guide pin 162 is a cylindrical member fixed to housing section 154 and guide pin 160 is movably mounted on housing section 152. Guide pin 160 is adapted to be displaced by the rigid guide pin 150 on stop plate 136 when cassette 14 is located at recording and reproducing station 12.

Figure 6:
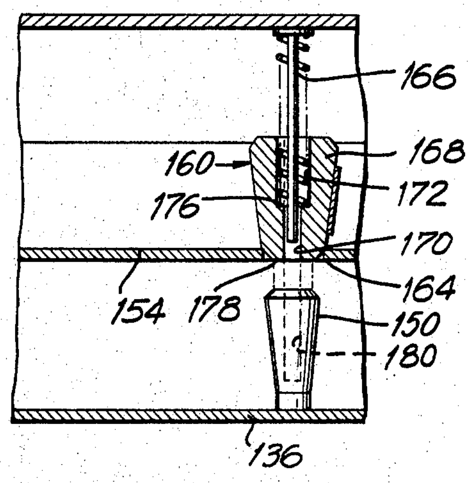
FIG. 6 is a sectional view taken on line 6—6 of FIG. 1 immediately prior to insertion of the cassette at the first station.
Figure 7:
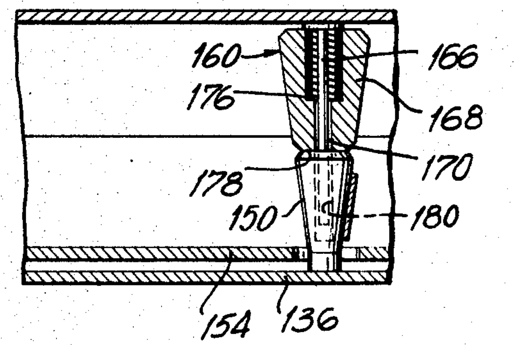
FIG. 7 is a view similar to FIG. 6 after insertion of the cassette at the first station.

As more clearly illustrated in FIG. 6 and 7, lower housing section 154 is provided with an aperture 164 through which guide pin 150 is adapted to be inserted. Guide pin 160 is slidably mounted on a shaft 166 secured to upper housing section 152 and comprises a tapered body 168 having first and second axially aligned guide bores 170 and 172 therein. Shaft 166 extends through bores 170 and 172 to guide sliding movement of body 168. Spring 174, held in compression between the upper surface of housing portion 152 and shoulder 176 formed at the juncture between bores 170 and 172, maintains body 168 adjacent aperture 164 when the cassette is not positioned at the recording and reproducing station (FIG. 6). In this manner tape 16 is guided from supply reel 156 over the surface of body 168 and then guide pin 162 and thence back to takeup reel 158. When cassette 14 is inserted at recording and reproducing station 12 and seated on deck 26 of the apparatus, guide pin 150 is engaged with the lower surface 178 of body 168 and urges the body upwardly towards housing section 152. Pin 150 includes a bore 180 which is adapted to receive shaft 166 to permit insertion of pin 150 within cassette 14. In this manner, tape 16 is transferred from body 168 to pin 150. It is noted that pin 150 has a tapered peripheral surface so as to alter the direction of travel of tape 16 to aid in providing the helical wrapping of the tape about drum 22 when the tape is drawn about the drum by tape guiding system 20. The taper of pin 150 cooperates with the reverse taper of guide pin 68 on plate 46 to assure proper helical wrapping of the tape and proper return of the tape to takeup reel 158.

It is thus seen that by the construction of the above described embodiment, when tape guiding system 20 is operated so that plate 46 is moved from station 12 to station 35, magnetic tape 16 is wrapped about the surface of drum 22 in an arcuate path of approximately 180°. construction of the preferred embodiment maintains the guide plate system in a relatively compact configuration at recording and reproducing station 12 for convenient engagement with tape 16. However, as guide plates 46 and 48 are moved to second station 35, the angular relationship thereof is changed so that the arcuate distance between pins 78 and 68 is increased to provide proper guiding arrangement for tape 16 whereby the tape is engaged against the surface of guide drum 22 as it is fed from the supply reel, and is held away from the surface thereof, after scanning by the heads 30, for return to takeup reel 158.

Although an illustrative embodiment of the present invention has been described herein with reference to the accompanying drawings, it is to be understood that the invention is not limited to that precise embodiment, and that various changes and modifications may be effected therein by one skilled in the art without departing from the scope or spirit of this invention.

What is claimed is:

1. In a tape recording and reproducing device having rotary magnetic head means adapted to record signals on and reproduce signals from a magnetic tape stored on reels on said device and a guide drum having a peripheral surface concentric with the path of the rotary head means to support the tape during the recording and reproducing of signals thereon; tape guiding means for withdrawing said tape from said reels and wrapping the withdrawn tape about said peripheral surface of the drum for scanning by said head means, said tape guiding means comprising a first guide plate rotatably mounted on said device for movement in an arcuate path about said periphery of said drum from a first station adjacent said reels to a second station arcuately remote from said first station, said first guide plate having at least one guide pin mounted thereon and extending generally perpendicularly therefrom, a portion of said tape being positioned at said first station between said drum and said guide pin whereby movement of said first guide plate from said first station to said second station engages said guide pin with said tape to move said tape into contact with said periphery of said drum, a second guide plate slidably mounted on said first guide plate, one of said first and second guide plates having at least one arcuate slot therein and the other of said guide plates having a pin slidably received in said arcuate slot for permitting independent movement of said first guide plate with respect to said second guide plate along an arcuate portion of said path as defined by the length of said slot, said second guide plate having a guide pin mounted thereon and extending generally perpendicularly thereto, and means for moving said first guide plate from said first to said second station whereby the permitted independent movement of said first guide plate with respect to said second guide plate varies the angular relation of said guide plates between said first and second stations and said guide pin on said second guide plate guides said tape at said second station along a return path remote from said drum as the tape is returned to said reels.

2. A tape recording and reproducing device as in claim 1 wherein said pin is positioned at one end of said slot and at said first station and said slot extends away from said member in the direction of rotation of said guide plates from said first to said second station.

3. A tape recording and reproducing device as in claim 2 wherein said slot extends along an arcuate path for approximately 30°.

4. A tape recording and reproducing device as in claim 2 wherein said means for moving said guide members is reversible, whereby said guide members are adapted to be returned to said first station upon completion of the recording and reproducing operation.

5. A tape recording and reproducing device as in claim 4 including first and second stop means defining said first and second stations respectively, said stop means limiting arcuate movement of said second guide member beyond said stations.

6. A tape recording and reproducing device as in claim 4 wherein there is an additional guide pin on said first guide member and one of said guide pins on said first guide member is tapered to alter the direction of tape travel.

7. A tape recording and reproducing device as in claim 6 including a stationary guide pin mounted on said device adjacent said first station, said stationary guide pin having a tapered surface to alter the direction of travel of said tape from said reels to said drum whereby said tape is obliquely directed for helical scanning by said head means during recording and reproducing.

8. A tape cassette for use in a recording and reproducing apparatus having a rotary magnetic head, a guide drum having a peripheral surface concentric with the path of the rotary head means to support the tape during the recording and reproducing of signals thereon, means for withdrawing said tape from said cassette and wrapping the withdrawn tape about said peripheral surface of the drum for scanning by said head means, and a stationary guide pin at the recording and reproducing station in said apparatus for engaging and locating said cassette at said station, said cassette comprising a housing containing supply and takeup reels rotatably mounted therein and having a supply of tape wound on said reels, said housing having an opening at one end thereof, said opening being presented to said head at said recording and reproducing station, means in said housing for guiding said tape from said supply reel to said takeup reel along a path directed through said opening whereby said tape is adapted to be engaged by said tape withdrawing means, said guide means including a guide pin slidably mounted in said housing and positioned for engagement by said stationary guide pin at said recording and reproducing station, said stationary pin displacing said guide pin in said housing when said cassette is inserted in said recording and reproducing station whereby said tape is engaged with said stationary pin during the recording and reproducing operation.

9. A tape cassette as in claim 8 including spring means biasing said guide pin towards a first position adjacent the base of said housing, said housing having an aperture in said base adjacent said pin through which said stationary guide pin is inserted at said recording and reproducing station, whereby said stationary guide pin displaces said guide pin, against the action of said spring means, towards the top of said housing.

10. A tape cassette as in claim 9 wherein said guide pin is tapered.

11. A tape cassette as in claim 9 wherein said housing has a second opening therein along the path of travel of said tape, said second opening granting access to said tape for the capstan and pinch roller of said recording and reproducing apparatus.

12. In a tape recording and/or reproducing device having rotary magnetic head means adapted to record signals on, and reproduce signals from a magnetic tape extending between reels contained in a tape cassette, and a guide drum spaced from the cassette and having a peripheral surface concentric with the path of the rotary head means to support the tape during the recording and reproducing of signals thereon; apparatus for selectively withdrawing said tape from said cassette and wrapping the withdrawn tape about said peripheral surface of the drum for scanning by said head means, said apparatus comprising, first and second plate members mounted for rotational movement independently of each other about the periphery of said drum, means for rotationally moving said first plate member between a first station at which said first plate member extends from said guide drum toward said cassette and a second station remote from said cassette, first tape guide means on said first plate member engageable with said tape in the cassette when at said first station and withdrawing a loop of tape from said cassette and wrapping one side of the loop about said peripheral surface of the drum in response to the movement of said first plate member to said second station, said first and second plate members having cooperating means for limiting the rotational displacement of said second plate member relative to said first plate member so that said second plate member is constrained to follow, with lost motion, the rotational movements of said first plate member between said first and second stations, and second tape guide means on said second plate movements of member disposed in trailing relation to said first tape guide means considered in the direction of movement from said first station to said second station and being located relatively close to said first tape guide means at said first station for convenient engagement with the tape in said cassette with the distance between said first and second tape guide means being substantially increased in response to said lost motion with which the movement of said second plate member follows the movement of said first plate member to said second station so that said second tape guide means then holds the other side of said loop away from said peripheral surface of the guide drum.

13. A tape recording and/or reproducing device according to claim 12, in which said means for rotationally moving said first plate member includes a rotatable ring-like member surrounding said guide drum and having said first plate member secured thereto.

14. A tape recording and/or reproducing device according to claim 12, further comprising stop means for limiting the rotational movement of said second plate member about said drum to less than the rotational movement of said first plate member between said first and second stations.

* * * * *